United States Patent
Chiang

(10) Patent No.: US 10,506,636 B2
(45) Date of Patent: Dec. 10, 2019

(54) TRANSCEIVING APPARATUS AND SPECTRUM ACCESS CONTROLLING METHOD THEREOF

(71) Applicant: Sercomm Corporation, Taipei (TW)

(72) Inventor: Kun-Lin Chiang, Taipei (TW)

(73) Assignee: Sercomm Corporation, Taipei (TW)

( * ) Notice: Subject to any disclaimer, the term of this patent is extended or adjusted under 35 U.S.C. 154(b) by 87 days.

(21) Appl. No.: 15/838,359

(22) Filed: Dec. 12, 2017

(65) Prior Publication Data
US 2019/0159250 A1 May 23, 2019

(30) Foreign Application Priority Data
Nov. 22, 2017 (TW) .............................. 106140425 A

(51) Int. Cl.
*H04W 74/08* (2009.01)
*H04B 17/318* (2015.01)
*H04W 16/14* (2009.01)

(52) U.S. Cl.
CPC ...... *H04W 74/0808* (2013.01); *H04B 17/318* (2015.01); *H04W 16/14* (2013.01)

(58) Field of Classification Search
None
See application file for complete search history.

(56) References Cited

U.S. PATENT DOCUMENTS

| | | |
|---|---|---|
| 2016/0135080 A1 | 5/2016 | Pazhyannur et al. |
| 2016/0173361 A1 | 6/2016 | Somasundaram et al. |
| 2017/0006599 A1 | 1/2017 | Dinan |
| 2017/0006640 A1 | 1/2017 | Dinan |

(Continued)

FOREIGN PATENT DOCUMENTS

| | | |
|---|---|---|
| CN | 106452705 | 2/2017 |
| CN | 106559830 | 4/2017 |

(Continued)

OTHER PUBLICATIONS

Li, et al. "Coexistence of Wi-Fi and LAA Networks with Adaptive Energy Detection" IEEE Transactions on Vehicular Technology Publication Date : Aug. 17, 2017. (Year: 2017).*

(Continued)

*Primary Examiner* — Jeffrey M Rutkowski
*Assistant Examiner* — Basil Ma
(74) *Attorney, Agent, or Firm* — JCIPRNET

(57) ABSTRACT

A transceiving apparatus and a spectrum access controlling method thereof are provided. The transceiving apparatus may utilize an unlicensed spectrum. In the method, feedback information related to accessing the unlicensed spectrum is received. An energy detection threshold is modified according to the feedback information. Whether to access the unlicensed spectrum is determined according to the modified energy detection threshold. If a signal strength detected on the unlicensed spectrum is greater than the energy detection threshold, an access to the unlicensed spectrum is disabled. If the signal strength detected on the unlicensed spectrum is not greater than the energy detection threshold, the access to the unlicensed spectrum is performed. Accordingly, the chance that a data transmission collision occurs is decreased, and a utilization rate of the unlicensed spectrum is improved.

15 Claims, 4 Drawing Sheets

(56) References Cited

U.S. PATENT DOCUMENTS

| | | |
|---|---|---|
| 2017/0006641 A1 | 1/2017 | Dinan |
| 2017/0019909 A1 | 1/2017 | Si et al. |
| 2017/0034831 A1 | 2/2017 | Yerramalli et al. |
| 2017/0078897 A1 | 3/2017 | Duan et al. |
| 2017/0078994 A1 | 3/2017 | Dinan |
| 2017/0078995 A1 | 3/2017 | Dinan |
| 2017/0079013 A1* | 3/2017 | Noh ............ H04W 72/042 |
| 2017/0079028 A1 | 3/2017 | Dinan |
| 2017/0085345 A1 | 3/2017 | Dinan |
| 2017/0086172 A1 | 3/2017 | Dinan |
| 2017/0094672 A1 | 3/2017 | Yerramalli et al. |
| 2017/0099667 A1 | 4/2017 | Dinan |
| 2017/0099678 A1 | 4/2017 | Dinan |
| 2017/0111888 A1 | 4/2017 | Dinan |
| 2017/0126300 A1 | 5/2017 | Park et al. |
| 2017/0142751 A1 | 5/2017 | Liu et al. |
| 2017/0180567 A1 | 6/2017 | Sharma et al. |
| 2017/0222749 A1 | 8/2017 | Dinan |
| 2017/0222776 A1 | 8/2017 | Dinan |
| 2017/0222856 A1 | 8/2017 | Dinan |
| 2017/0223564 A1 | 8/2017 | Dinan |
| 2017/0223635 A1 | 8/2017 | Dinan |
| 2017/0223640 A1 | 8/2017 | Dinan |
| 2017/0223672 A1 | 8/2017 | Dinan et al. |
| 2017/0223673 A1 | 8/2017 | Dinan et al. |
| 2017/0223674 A1 | 8/2017 | Dinan et al. |
| 2017/0223675 A1 | 8/2017 | Dinan et al. |
| 2017/0223676 A1 | 8/2017 | Dinan et al. |
| 2017/0223677 A1 | 8/2017 | Dinan et al. |
| 2017/0223739 A1 | 8/2017 | Mallik et al. |
| 2017/0230944 A1 | 8/2017 | Babaei et al. |
| 2017/0230945 A1 | 8/2017 | Babaei et al. |
| 2017/0231002 A1 | 8/2017 | Babaei et al. |
| 2017/0231004 A1 | 8/2017 | Babaei et al. |
| 2017/0231005 A1 | 8/2017 | Babaei et al. |
| 2017/0272199 A1 | 9/2017 | Dinan |
| 2017/0272200 A1 | 9/2017 | Dinan |
| 2017/0273109 A1 | 9/2017 | Babaei et al. |
| 2017/0279583 A1 | 9/2017 | Dinan |
| 2017/0290040 A1 | 10/2017 | Dinan |
| 2017/0339693 A1* | 11/2017 | Cierny ............ H04W 16/14 |
| 2017/0353975 A1* | 12/2017 | Khawer ............ H04B 17/318 |
| 2018/0234886 A1* | 8/2018 | Bhorkar ............ H04W 28/18 |

FOREIGN PATENT DOCUMENTS

| | | |
|---|---|---|
| CN | 107005357 | 8/2017 |
| CN | 107222921 | 9/2017 |

OTHER PUBLICATIONS

R1-157255 3GPP TSG RAN WG1 Meeting #83 Ericsson "On Energy Detection Threshold for LAA" Nov. 20, 2015 (Year: 2015).*

"Office Action of Taiwan Counterpart Application", dated Aug. 20, 2018, p. 1-p. 12.

"On Energy Detection Threshold for LAA," 3GPP TSG RAN WG1 Meeting #83, Nov. 2015, pp. 1-14.

* cited by examiner

TRANSCEIVING APPARATUS AND SPECTRUM ACCESS CONTROLLING METHOD THEREOF

CROSS-REFERENCE TO RELATED APPLICATION

This application claims the priority benefit of Taiwan application serial no. 106140425, filed on Nov. 22, 2017. The entirety of the above-mentioned patent application is hereby incorporated by reference herein and made a part of this specification.

BACKGROUND OF THE DISCLOSURE

Field of the Disclosure

The disclosure relates to radio resource management and more particularly relates to a transceiving apparatus and a spectrum access controlling method thereof.

Description of Related Art

The rapidly growing demand and throughput of mobile networks (e.g., the third generation (3G) and fourth generation (4G) mobile communications) have prompted telecom operators to seek more spectrum or build more base stations. Regarding the available spectrum, referring to FIG. 1, in addition to obtaining licensed spectrum through the official authorities, telecom operators may utilize an unlicensed spectrum to provide data offload or carrier aggregation (CA) for transmission on the licensed spectrum. Although there may be many signals of other communication technologies (e.g., Wi-Fi, Bluetooth, and so on) in the unlicensed spectrum, the standards related to mobile networks have provided a Listen Before Talk (LBT) mechanism to effectively avoid a collision. For example, on the basis of LTE Licensed Assisted Access (LAA)/Enhanced Licensed Assisted Access (eLAA) technologies in the Third Generation Partnership Project (3GPP) Long Term Evolution-Advanced (LTE-A) pro R13/R14 standards, the user equipment (UE) and the base station (BS) will perform carrier energy detection on the unlicensed spectrum before accessing the unlicensed spectrum, so as to prevent a collision with the signals transmitted by other devices on the unlicensed spectrum. If the signal strength measured on the unlicensed spectrum is greater than an energy detection threshold, the UE and the BS determine that this unlicensed spectrum is in a busy state and wait. On the other hand, if the signal strength detected on the unlicensed spectrum is not greater than the energy detection threshold, the UE and the BS determine that this unlicensed spectrum is in an idle state, and the UE and the BS will use this unlicensed spectrum for uplink/downlink data transmissions. The above-described mechanism is the clear channel assessment (CCA) procedure.

It is known from the above that the energy detection threshold is an important factor for assessing whether the UE and BS can access the unlicensed spectrum for data transmissions. According to the current technology, however, the UE and BS use only one preset energy detection threshold for evaluating the accessibility of the unlicensed spectrum. As the use or quality of the unlicensed spectrum changes, using one single preset energy detection threshold may result in a long idle time for the spectrum or a data transmission collision. Therefore, the current mechanism for accessing the unlicensed spectrum needs to be improved.

SUMMARY OF THE DISCLOSURE

The disclosure provides a transceiving apparatus and a spectrum access controlling method thereof, by which an energy detection threshold is modified dynamically to effectively utilize an unlicensed spectrum and avoid a data transmission collision.

The disclosure provides a spectrum access controlling method adapted for a transceiving apparatus that uses an unlicensed spectrum. The spectrum access controlling method includes: receiving feedback information related to accessing the unlicensed spectrum; modifying an energy detection threshold according to the feedback information; and determining whether to access the unlicensed spectrum according to the energy detection threshold. If a signal strength detected on the unlicensed spectrum is greater than the energy detection threshold, an access to the unlicensed spectrum is disabled; and if the signal strength detected on the unlicensed spectrum is not greater than the energy detection threshold, the access to the unlicensed spectrum is performed.

The disclosure further provides a transceiving apparatus, including a receiving circuit, a transmitting circuit, and a processing circuit. The receiving circuit is configured to receive a signal through an unlicensed spectrum. The transmitting circuit transmits the signal through the unlicensed spectrum. The processing circuit is coupled to the receiving circuit and the transmitting circuit and configured to: receive feedback information related to accessing the unlicensed spectrum; modify an energy detection threshold according to the feedback information; and determine whether to access the unlicensed spectrum according to the energy detection threshold. If a signal strength detected on the unlicensed spectrum is greater than the energy detection threshold, an access to the unlicensed spectrum is disabled; and if the signal strength detected on the unlicensed spectrum is not greater than the energy detection threshold, the access to the unlicensed spectrum is performed via the transmitting circuit.

To make the aforementioned and other features and advantages of the disclosure more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1:
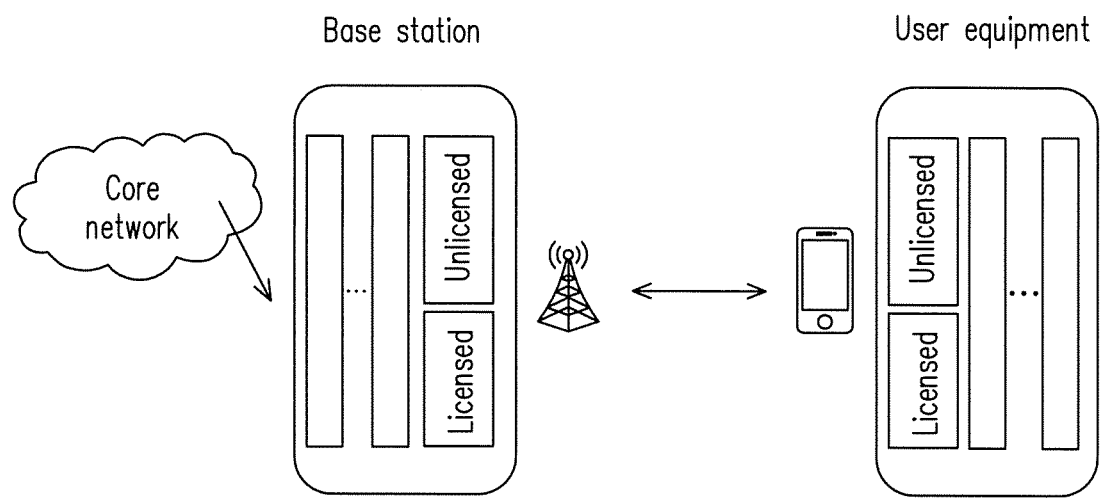
FIG. 1 is a schematic diagram showing the conventional use of unlicensed spectrum and licensed spectrum.
Figure 2:
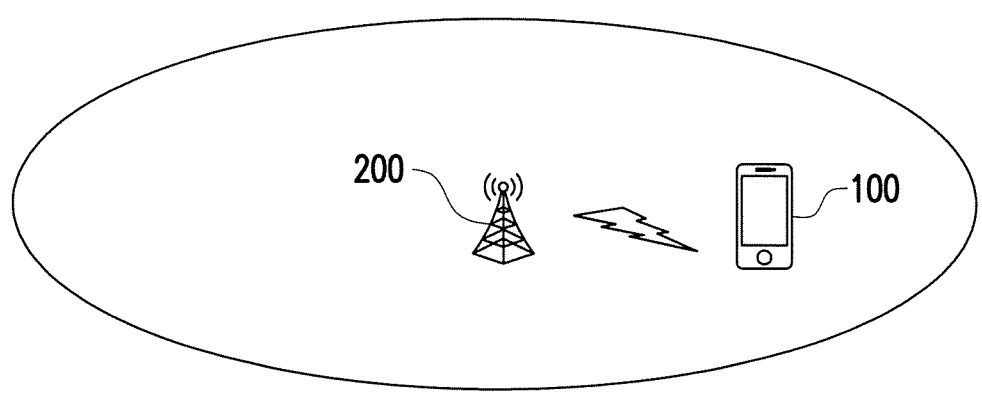
FIG. 2 is a schematic diagram of a communication system according to an embodiment of the disclosure.

FIG. 2 is a schematic diagram of a communication system 1 according to an embodiment of the disclosure. Referring to FIG. 2, the communication system 1 includes at least, but not limited to, UE 100 and a BS 200. The UE 100 and the BS 200 use a mobile (or cellular) communication network (e.g., 3G, 4G, or a higher generation mobile network).

The UE 100 may be embodied in various forms, which may include (but not limited to) a mobile station, an advanced mobile station (AMS), a telephone device, customer premise equipment (CPE), a wireless sensor, and so on, for example.

Figure 3A:
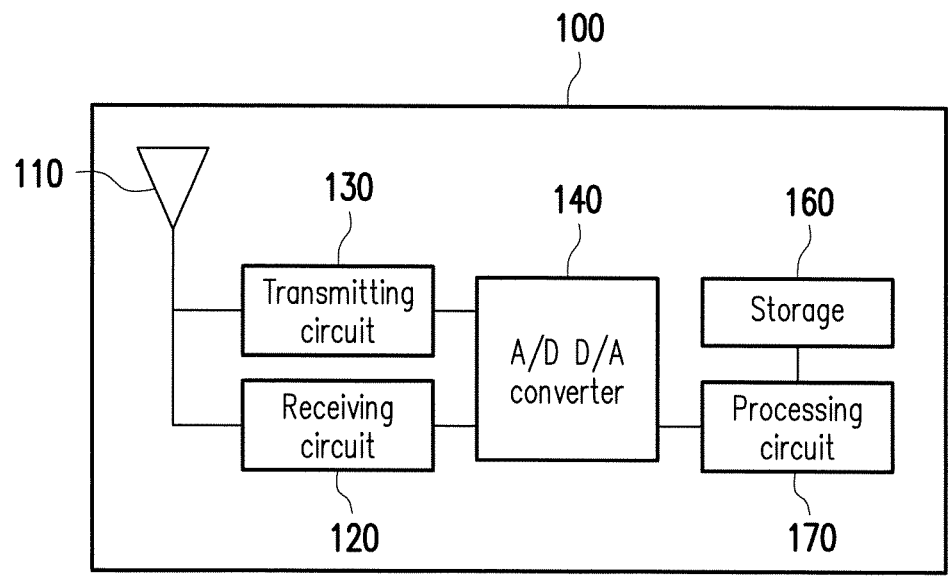
FIG. 3A is a component block diagram of user equipment according to an embodiment of the disclosure.

FIG. 3A is a component block diagram of the UE 100 according to an embodiment of the disclosure. The UE 100 may include at least (but not limited to) an antenna 110, a receiving circuit 120, a transmitting circuit 130, an analog-to-digital (A/D)/digital-to-analog (D/A) converter 140, a storage 160, and a processing circuit 170.

The receiving circuit 120 and the transmitting circuit 130 are respectively configured to receive a downlink signal or transmit an uplink signal through a licensed spectrum and/or an unlicensed spectrum via the antenna 110 wirelessly. It should be noted that use of all the frequency bands included in the licensed spectrum, e.g., the frequency bands of 900 and 1800 MHz, requires authorization of the related authorities. All the frequency bands included in the unlicensed spectrum, e.g., the industrial scientific medical frequency bands of 2.4 and 5 GHz, are free for use without authorization. The receiving circuit 120 and the transmitting circuit 130 may also execute an analog signal processing operation, such as low noise amplification, impedance matching, mixing, up-conversion or down-conversion, filtering, amplification, or the like. The analog-to-digital/digital-to-analog converter 140 is configured to convert an analog signal format to a digital signal format in a downlink signal processing period and convert a digital signal format to an analog signal format in an uplink signal processing period.

The storage 160 may be a fixed or movable random access memory (RAM) of any form, a read-only memory (ROM), a flash memory, similar devices, or a combination of the foregoing devices, for example. The storage 160 stores a program code, a device configuration, a codebook, or buffer or permanent data, and records various communication protocol-related software modules, such as a radio resource control (RRC) layer, a media access control (MAC) layer, an a physical (PHY) layer.

The processing circuit 170 is configured to process a digital signal and execute processes according to exemplary embodiments of the disclosure, and may access or load the data or software modules recorded by the storage 160. The function of the processing circuit 170 may be implemented by using a programmable unit, such as a CPU, a microprocessor, a micro-controller, a digital signal processing (DSP) chip, a field programmable gate array (FPGA), and so on. The function of the processing circuit 170 may also be implemented by an independent electronic device or an integrated circuit (IC), and the operation of the processing circuit 170 may also be implemented by software.

The BS 200 may be embodied in various forms, which may include (but not limited to) a home evolved node B (HeNB), an eNB, an advanced BS (ABS), a base transceiver system (BTS), a relay, a repeater, and/or a satellite-based communication base station, for example.

Figure 3B:
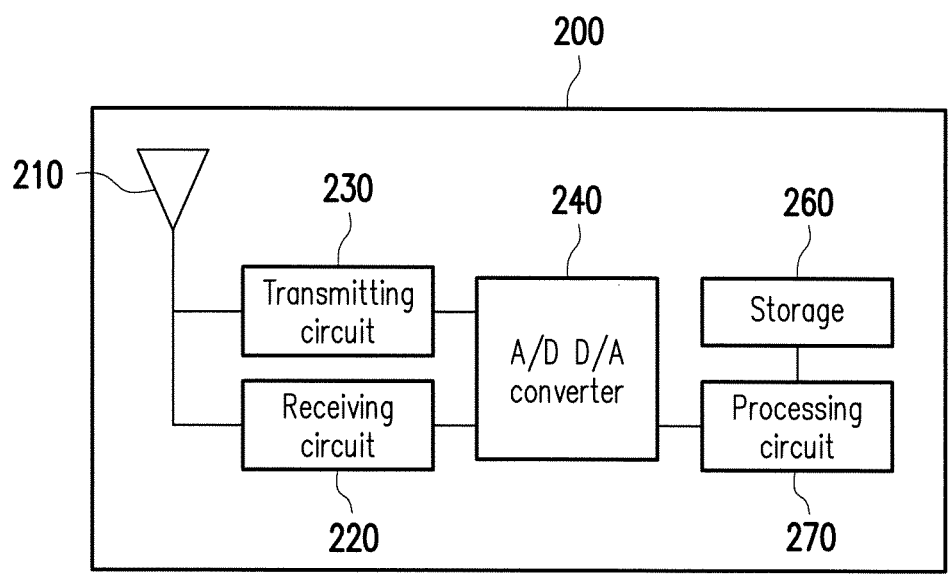
FIG. 3B is a component block diagram of a base station according to an embodiment of the disclosure.

FIG. 3B is a component block diagram of the BS 200 according to an embodiment of the disclosure. The BS 200 may include at least (but not limited to) an antenna 210, a receiving circuit 220, a transmitting circuit 230, an analog-to-digital (A/D)/digital-to-analog (D/A) converter 240, a storage 260, and a processing circuit 270.

The function of each component of the BS 200 is the same as or similar to that of the corresponding component of the UE 100 as described above with reference to FIG. 3A, and thus details thereof are not repeated hereinafter. Differences between the BS 200 and the UE 100 are that the receiving circuit 220 and the transmitting circuit 230 are respectively configured to receive an uplink signal and transmit a downlink signal. The analog-to-digital/digital-to-analog converter 240 is configured to convert an analog signal format to a digital signal format in an uplink signal processing period and convert a digital signal format to an analog signal format in a downlink signal processing period.

In order to make the operation process of the embodiment of the disclosure more comprehensible, several embodiments are provided below to describe in detail the operations of the UE 100 and the BS 200 in the embodiment of the disclosure.

Figure 4:
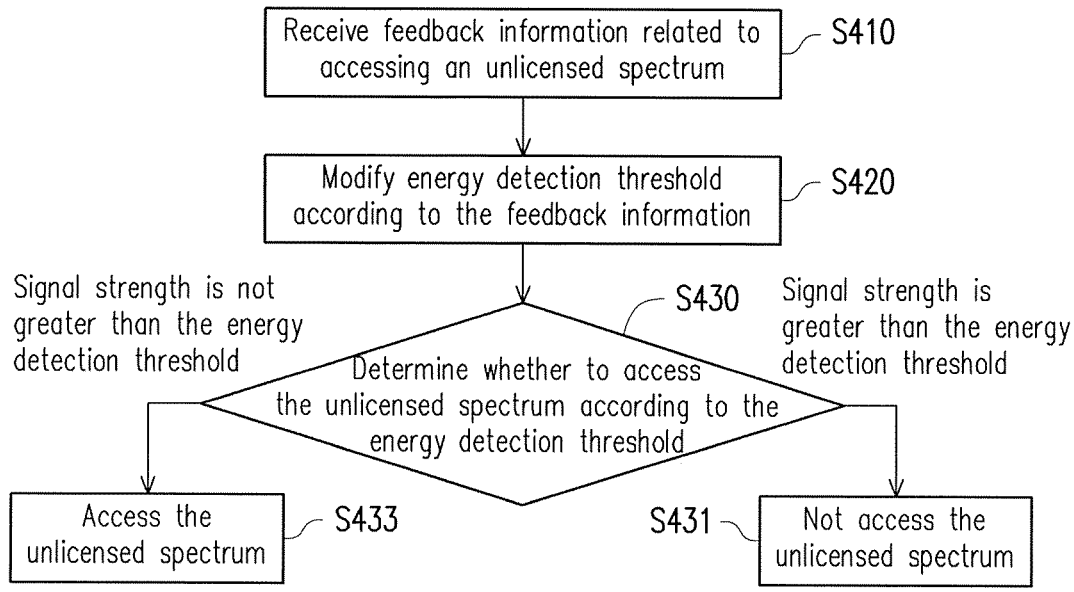
FIG. 4 is a flowchart of a spectrum access controlling method according to an embodiment of the disclosure.

FIG. 4 is a flowchart of a spectrum access controlling method according to an embodiment of the disclosure. Referring to FIG. 4, the method of this embodiment is adapted for the UE 100 and the BS 200 under the communication system 1 of FIG. 2. In the following paragraphs, the method of this embodiment of the disclosure is described first with reference to the components and modules of the UE 100. Nevertheless, the processes of this method may be adjusted according to the actual needs and thus are not limited to the following.

The processing circuit 170 of the UE 100 receives feedback information related to accessing an unlicensed spectrum via the receiving circuit 120 (Step S410). Specifically, it is assumed that the processing circuit 170 has transmitted a message through the unlicensed spectrum (that is, accessing the unlicensed spectrum) via the transmitting circuit 130, and then via the receiving circuit 120 the processing circuit 170 receives (through the unlicensed or licensed spectrum) the feedback information (e.g., an acknowledgment (ACK) message, a non-acknowledgment (NACK) message of a Hybrid Automatic Repeat-reQuest (HARQ) mechanism, or other reception indication information) related to whether the transmission on the unlicensed spectrum is received correctly. Alternatively, the processing circuit 170 may execute a measurement procedure in the unlicensed spectrum via the receiving circuit 120 to obtain the feedback information related to a channel condition (e.g., received signal strength indication (RSSI), received signal reception power, received signal quality, and so on) of the unlicensed spectrum. The feedback information may also include other information, but need to include the related information, such as the channel condition of the unlicensed spectrum (e.g., signal strength, quality, code used, and so on), or usage situation (e.g., the number of served devices, resource allocation situation, and so on).

After obtaining the feedback information, the processing circuit 170 may modify the energy detection threshold according to the feedback information (Step S420). Specifically, in a collision avoidance (CA) mechanism (e.g., Carrier Sense Multiple Access/Collision Avoidance (CSMA/CA), LBT, and so on) specified by some communication protocols, the apparatus detects whether the channel is in an idle state before transmission. The apparatus starts transmission after determining that the channel is in the idle state (in some mechanisms, a handshake procedure is also performed for confirmation). In the process of determining whether the channel is in the idle state, the energy detection threshold (or clear channel assessment threshold) is usually taken as a basis for the determination. If the signal strength detected is greater than the energy detection threshold, the channel under assessment is determined as being in a busy state; on the other hand, if the signal strength detected is not greater than the energy detection threshold, the channel under assessment is determined as being in the idle state.

According to the current technology, generally the energy detection threshold remains unchanged after initial configuration. According to the embodiment of the disclosure, however, the energy detection threshold is modified dynamically according to the feedback information related to accessing the unlicensed spectrum, and the energy detection threshold may be modified differently according to different contents of the feedback information. In an embodiment, it is assumed that the feedback information is related to whether the transmission on the unlicensed spectrum is received correctly; if feedback information indicating that the transmission on the unlicensed spectrum is not received correctly (for example, the feedback information is a NACK message), the processing circuit 170 lowers the energy detection threshold; and if the feedback information indicating that the transmission on the unlicensed spectrum is received correctly (for example, the feedback information is an ACK message), the processing circuit 170 increases the energy detection threshold. In addition, in order to reduce the frequency of modification of the energy detection threshold (for example, considering the power consumption), in some embodiments, the processing circuit 170 increases the energy detection threshold only if the number of times of consecutively receiving the feedback information indicating successful transmissions is greater than a number threshold (e.g., 3 or 5 times). The processing circuit 170 maintains the energy detection threshold if the number of times of consecutively receiving the feedback information indicating successful transmissions is not greater than the number threshold. If the feedback information is not received in a specific time interval (e.g., 800 milliseconds, 1 second, 5 seconds, and so on) after the aforementioned number of times of reception reaches one, the processing circuit 170 may reset the number of times of reception to 0, so as to cope with a rapid change of the state of the unlicensed spectrum.

It should be noted that there are various mechanisms for modifying the energy detection threshold, such as modifying the energy detection threshold when a total number of times is reached in a specific time, or the number of times of receiving one of ACK and NACK is greater than the number of times of receiving the other in a specific time regardless of whether certain feedback information is received consecutively, which may be adjusted according to the actual needs and thus are not limited to the above.

In another embodiment, it is assumed that the feedback information is related to the channel condition (e.g., RSSI, received signal quality, and so on) obtained in the aforementioned measurement procedure; if the value of the feedback information is inferior to a comparison threshold (for example, the RSSI is smaller than −80 dBm, the received signal quality is smaller than −70 dB, and so on), the processing circuit 170 lowers the energy detection threshold; and if the feedback information is not inferior to the comparison threshold, the processing circuit 170 increases the energy detection threshold. In addition, the processing circuit 170 may also adopt the mechanism of accumulating the number of times of reception, as described above, to reduce the number of times of modifying the energy detection threshold. Thus, details thereof are not repeated hereinafter.

It should be noted that the content of the feedback information may be other information that indicates the state of the unlicensed spectrum, and the basis for modifying the energy detection threshold may be different. For example, the energy detection threshold is increased in the cases of high transmission rate encoding (e.g., 64-Quadrature Amplitude Modulation (QAM), 256-QAM, and so on), fewer devices (e.g., one, three, and so on); otherwise, the energy detection threshold is reduced.

Then, before the next transmission, the processing circuit 170 determines whether to access the unlicensed spectrum according to the energy detection threshold (Step S430). If the signal strength that the processing circuit 170 detects on the unlicensed spectrum via the receiving circuit 120 is greater than the energy detection threshold, the access to the unlicensed spectrum is disabled (or stopped) (step S431) (for example, transmission of signals on the unlicensed spectrum is disabled); and if the signal strength detected on the unlicensed spectrum is not greater than the energy detection threshold, the access to the unlicensed spectrum is performed (step S433). It should be noted that, according to the embodiments of the disclosure, the energy detection threshold is modified. If the energy detection threshold is increased, the chance of accessing the unlicensed spectrum is increased relatively and the utilization rate of the unlicensed spectrum is raised; on the other hand, if the energy detection threshold is reduced, the chance of accessing the unlicensed spectrum is reduced relatively, and the possibility of a data collision is reduced. Step S410 to Step S430 as described above are repeated, by which the function of dynamically modifying the energy detection threshold is achieved.

A spectrum access controlling method for the BS 200 may be understood by referring to FIG. 4 and the UE 100 described above. A difference between this embodiment and the previous embodiment is that the feedback information of the BS 200 may be the channel state information (CSI) (including a channel quality indicator (CQI), a precoding matrix indicator (PMI), a rank indicator (RI), and so on) reported by the UE 100 or other information for indicating the channel condition. In Step S420, the processing circuit 270 of the BS 200 increases the energy detection threshold when the CQI index is greater than the corresponding comparison threshold or when the PMI and RI are received; or otherwise reduces the energy detection threshold.

In addition, when scheduling of multiple UEs is taken into consideration, if there are multiple downlink data transmissions to be performed at the same time, the energy detection thresholds may be modified to different values in consideration of the following three factors. In order to avoid a collision on the unlicensed spectrum, the processing circuit 270 may set the energy detection threshold in a current schedule to a minimum of all the downlink data transmissions (i.e., all the UEs 100). In order to avoid wasting the unlicensed spectrum, the processing circuit 270 may set the energy detection threshold in the current schedule to a maximum of all the downlink data transmissions. Furthermore, when both of the aforementioned two situations are taken into consideration, the processing circuit 270 may set the energy detection threshold in the current schedule to an average of all the downlink data transmissions. It should be noted that, in some other embodiments, other statistical indicators, such as median, mode, and so on, may also serve as the basis for modifying the energy detection threshold.

Next, two exemplary scenarios are provided below to better illustrate the spirit of some embodiments of the disclosure.

Figure 5:
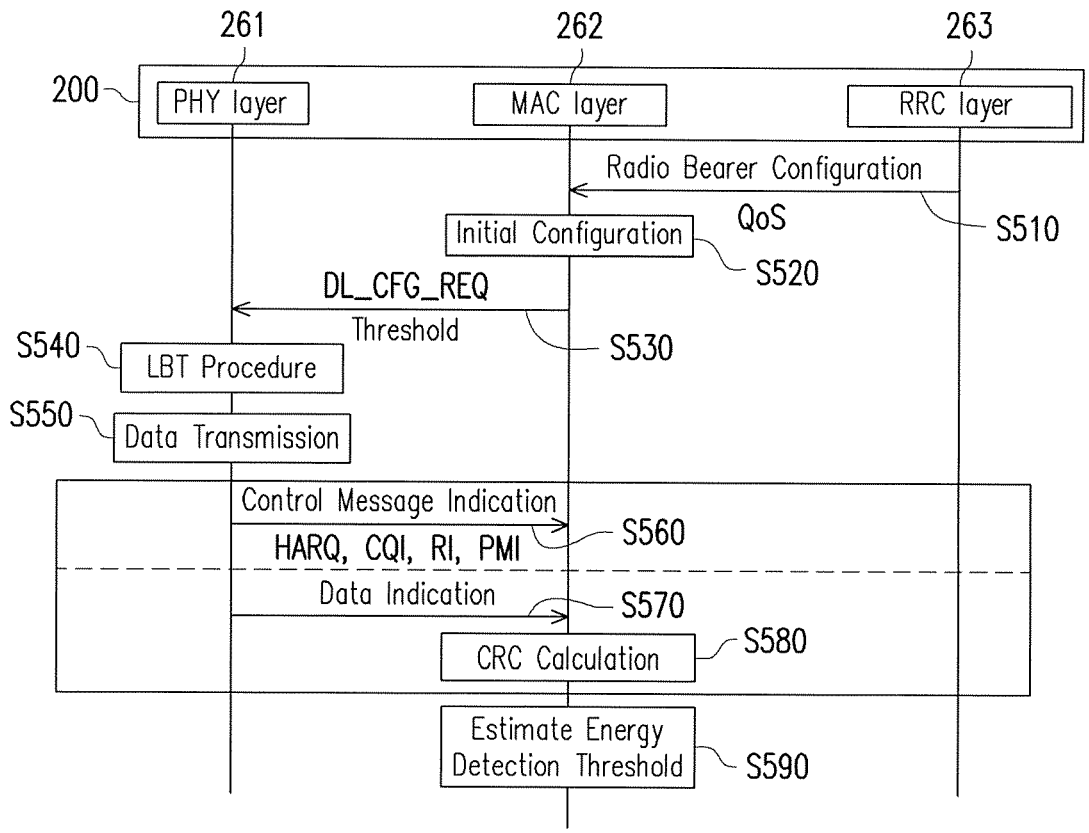
FIG. 5 is a flowchart showing an example where a BS accesses an unlicensed spectrum for downlink data transmission.

In the first application scenario, in a licensed assisted access (LAA) technique, the BS 200 accesses the unlicensed spectrum to perform downlink data transmission. Referring to FIG. 5, it is assumed that the storage 260 of the BS 200 records at least software modules of a PHY layer 261, a MAC layer 262, and a RRC layer 263 (to be accessed and loaded by the processing circuit 270). The RRC layer 263 transmits a radio bearer configuration to indicate the quality of service (QoS) to the MAC layer 262 (Step S510). Then, the MAC layer 262 respectively modifies the energy detection threshold of each UE 100 as an initial configuration according to the CQI reported by the UE 100 that requires a downlink bandwidth (Step S520), and puts the energy detection threshold in a downlink configuration request DL_CFG_REQ to inform the PHY layer 261 (Step S530). It should be noted that the initial configuration may be set to the maximum, the minimum, the average, or any value of all the downlink data transmissions for different considerations.

Next, the BS 200 performs carrier energy detection on the unlicensed spectrum based on the LBT mechanism, and determines whether to access the unlicensed spectrum according to the energy detection threshold set in Step S520 (Step S540). If the result shows that the unlicensed spectrum is accessible, the BS 200 performs the downlink data transmission on the unlicensed spectrum (Step S550). After receiving the downlink data transmission, the UE 100 informs the BS 200 about whether the transmission is received correctly by feeding back the ACK or NACK message through the HARQ mechanism; or informs the BS 200 about whether the current channel condition is good or not by feeding back the CSI, such as CQI, RI, PMI, and so on. The PHY layer 261 takes the feedback information as a control message indication and informs the MAC layer 262 of the control message indication and other data indications (Step S560 and Step S570). The MAC layer 262 performs a cyclic redundancy check (CRC) according to the aforementioned indications to check the correctness of the data (Step S580), and then estimates and modifies the energy detection threshold for the next transmission according to the ACK message, the NACK message or CSI of the feedback information (Step S590) and performs the CCA procedure according to the modified energy detection threshold. Furthermore, when there are multiple UEs 100 having downlink data transmission that need to access the unlicensed spectrum, in order to avoid a collision, the BS 200 may select the minimum energy detection threshold among the UEs 100 to serve as the energy detection threshold for the current transmission, so as to perform the subsequent carrier energy detection, CCA procedure, and downlink data transmission (i.e., repeating Step S540 and Step S5550) and then stop the foregoing procedures when the BS 200 has no need to access the unlicensed spectrum.

Figure 6:
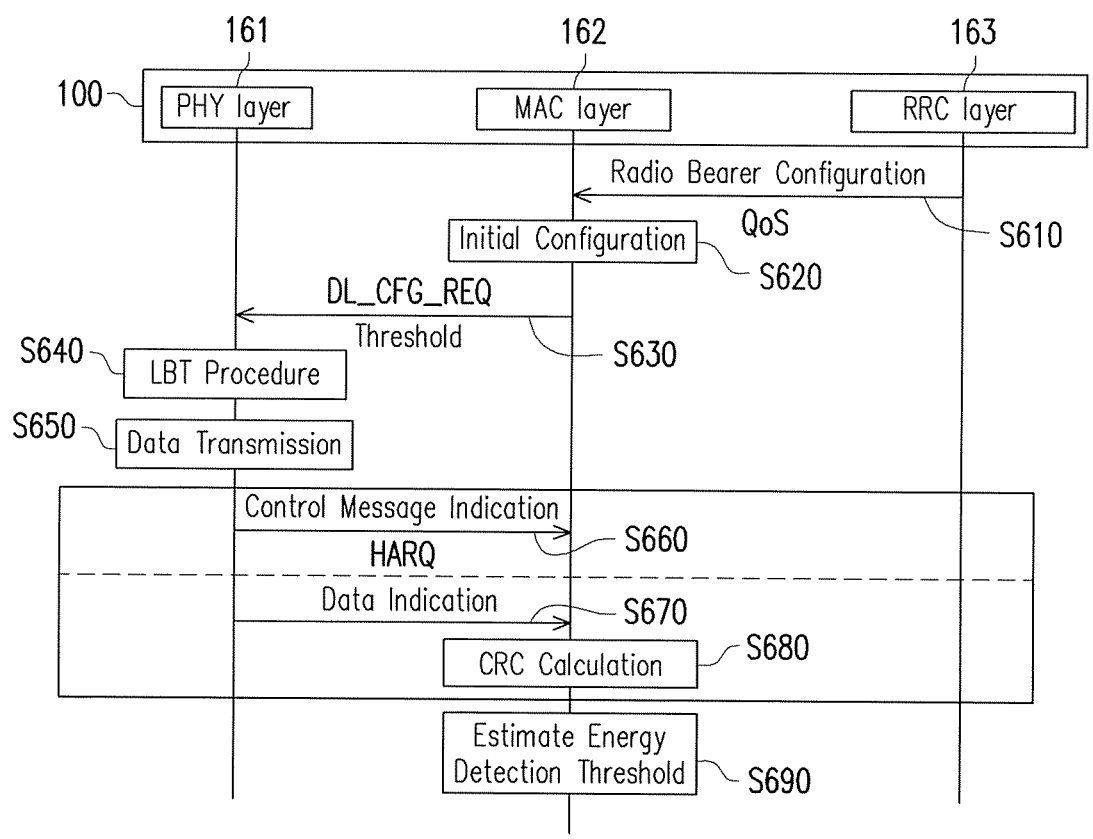
FIG. 6 is a flowchart showing an example where UE accesses an unlicensed spectrum for uplink data transmission.

In the second application scenario, in the LAA technique, the UE 100 accesses the unlicensed spectrum to perform uplink data transmission. Referring to FIG. 6, it is assumed that the storage 160 of the UE 100 records at least software modules of a PHY layer 161, a MAC layer 162, and a RRC layer 163 (to be accessed and loaded by the processing circuit 170). Steps of FIG. 6 that are the same as or similar to those of FIG. 5 may be understood by referring to the above corresponding steps and thus details thereof are not repeated hereinafter. A difference between this application scenario and the application scenario of FIG. 5 is that, in this application scenario, the UE 100 may select an energy detection threshold randomly or according to the received signal strength obtained in the measurement procedure to serve as the initial configuration (Step S620). The BS 200 feeds back the ACK or NACK message in response to the uplink data transmission in Step S650 and enables the PHY layer 161 to provide feedback information of HARQ-related control message indication (Step S660) and enables the MAC layer 162 to estimate and modify the energy detection threshold according to the feedback information (Step S690).

It should be noted that the above-described embodiments are directed to the UE 100 and the BS 200 that use a mobile communication network. In some other embodiments, however, the aforementioned spectrum access controlling method may be applied to other radio transceiving apparatuses using the licensed spectrum and the unlicensed spectrum (which may be other apparatuses use communication technologies other than the mobile communication network, such as radar, video set-top box, wireless router, and so on), but it should be noted that details of the feedback information and modification of the energy detection threshold may be adjusted according to the application scenarios.

To sum up, the transceiving apparatus (e.g., BS, UE, and so on) according to the embodiments of the disclosure may dynamically modify the energy detection threshold based on the feedback information, so as to increase or reduce the chance that the transceiving apparatus accesses the unlicensed spectrum at the right time according to the state of the unlicensed spectrum, and thereby prevent a data collision or a long idle time of the unlicensed spectrum. In addition, by recording the number of times of consecutively receiving the feedback information of the same content, the frequency of modifying the energy detection threshold may be reduced to lower power consumption. It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A spectrum access controlling method, adapted for a transceiving apparatus that uses an unlicensed spectrum and a licensed spectrum, the spectrum access controlling method comprising:

receiving, via the unlicensed spectrum or the licensed spectrum, feedback information related to accessing the unlicensed spectrum;

modifying an energy detection threshold for accessing the unlicensed spectrum according to the feedback information, comprising:

reducing the energy detection threshold if channel state information (CSI) of the unlicensed spectrum is inferior to a comparison threshold, wherein the feedback information comprises the CSI; and increasing the energy detection threshold if the CSI is not inferior to the comparison threshold; and determining whether to access the unlicensed spectrum according to the energy detection threshold, wherein if a signal strength detected on the unlicensed spectrum is greater than the energy detection threshold, an access to the unlicensed spectrum is disabled; and if the signal strength detected on the unlicensed spectrum is not greater than the energy detection threshold, the access to the unlicensed spectrum is performed.

2. The spectrum access controlling method according to claim 1, wherein the feedback information is related to whether a transmission on the unlicensed spectrum is received correctly, and modifying the energy detection threshold according to the feedback information comprises:

reducing the energy detection threshold if the feedback information indicates the transmission on the unlicensed spectrum is not received correctly; and increasing the energy detection threshold if the feedback information indicates the transmission on the unlicensed spectrum is received correctly.

3. The spectrum access controlling method according to claim 2, wherein increasing the energy detection threshold comprises:

increasing the energy detection threshold if the number of times of consecutively receiving the feedback information indicating the transmission on the unlicensed spectrum is received correctly is greater than a number threshold; and maintaining the energy detection threshold if the number of times of consecutively receiving the feedback information indicating the transmission on the unlicensed spectrum is received correctly is not greater than the number threshold.

4. The spectrum access controlling method according to claim 2, wherein the feedback information comprises an acknowledgment (ACK) message or a non-acknowledgment (NACK) message.

5. The spectrum access controlling method according to claim 1, wherein the feedback information is related to a channel condition.

6. The spectrum access controlling method according to claim 5, wherein the CSI comprises a channel quality indicator (CQI), a precoding matrix indicator (PMI), and a rank indicator (RI).

7. The spectrum access controlling method according to claim 1, wherein before receiving the feedback information related to the access to the unlicensed spectrum, the spectrum access controlling method further comprises:

setting the energy detection threshold of a schedule as a maximum, a minimum, or an average of a plurality of downlink data transmissions for the downlink data transmissions.

8. A transceiving apparatus, comprising:
a receiving circuit, receiving a signal through an unlicensed spectrum or a licensed spectrum;
a transmitting circuit, transmitting the signal through the unlicensed spectrum or the licensed spectrum; and
a processing circuit, coupled to the receiving circuit and the transmitting circuit and configured to:
receive, via the unlicensed spectrum or the licensed spectrum, feedback information related to accessing the unlicensed spectrum via the receiving circuit;
modify an energy detection threshold for accessing the unlicensed spectrum according to the feedback information, comprising:
reducing the energy detection threshold if channel state information (CSI) of the unlicensed spectrum is inferior to a comparison threshold, wherein the feedback information comprises the CSI; and
increasing the energy detection threshold if the CSI is not inferior to the comparison threshold; and
determine whether to access the unlicensed spectrum according to the energy detection threshold,
wherein if a signal strength detected on the unlicensed spectrum is greater than the energy detection threshold, an access to the unlicensed spectrum is disabled; and
if the signal strength detected on the unlicensed spectrum is not greater than the energy detection threshold, the access to the unlicensed spectrum is performed via the transmitting circuit.

9. The transceiving apparatus according to claim 8, wherein the feedback information is related to whether a transmission using the unlicensed spectrum is received correctly, and the processing circuit is configured to:

reduce the energy detection threshold if the feedback information indicates the transmission on the unlicensed spectrum is not received correctly; and increase the energy detection threshold if the feedback information indicates the transmission on the unlicensed spectrum is received correctly.

10. The transceiving apparatus according to claim 9, wherein the processing circuit is configured to:

increase the energy detection threshold if the number of times of consecutively receiving the feedback information indicating the transmission on the unlicensed spectrum is received correctly is greater than a number threshold; and maintain the energy detection threshold if the number of times of consecutively receiving the feedback information indicating the transmission on the unlicensed spectrum is received correctly is not greater than the number threshold.

11. The transceiving apparatus according to claim 9, wherein the feedback information comprises an ACK message or a NACK message.

12. The transceiving apparatus according to claim 8, wherein the feedback information is related to a channel condition.

13. The transceiving apparatus according to claim 12, wherein the CSI comprises a CQI, a PMI, and a RI.

14. The transceiving apparatus according to claim 8, wherein the processing circuit is configured to:

set the energy detection threshold of a schedule as a maximum, a minimum, or an average of a plurality of downlink data transmissions for the downlink data transmissions.

15. The transceiving apparatus according to claim 8, wherein the transceiving apparatus is a base station or user equipment using a mobile network.

* * * * *